United States Patent
Müller et al.

(10) Patent No.: US 12,285,902 B2
(45) Date of Patent: Apr. 29, 2025

(54) METHOD FOR PRODUCING A COMPONENT MADE OF A FIBER-REINFORCED PLASTIC

(71) Applicant: ZF Friedrichshafen AG, Friedrichshafen (DE)

(72) Inventors: Ingolf Müller, Freimersheim (DE); Erik Grabowski, Pforzheim (DE); Andre Stieglitz, Osnabrück (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 18/273,955

(22) PCT Filed: Dec. 9, 2021

(86) PCT No.: PCT/EP2021/085001
§ 371 (c)(1),
(2) Date: Jul. 24, 2023

(87) PCT Pub. No.: WO2022/161681
PCT Pub. Date: Aug. 4, 2022

(65) Prior Publication Data
US 2024/0408810 A1   Dec. 12, 2024

(30) Foreign Application Priority Data
Jan. 28, 2021   (DE) .................. 10 2021 200 772.4

(51) Int. Cl.
*B29C 70/38*   (2006.01)
*B29C 53/56*   (2006.01)
(Continued)

(52) U.S. Cl.
CPC ........ *B29C 53/8041* (2013.01); *B29C 53/564* (2013.01); *B29C 53/8016* (2013.01);
(Continued)

(58) Field of Classification Search
CPC .................................................. B29C 70/382
See application file for complete search history.

(56) References Cited

U.S. PATENT DOCUMENTS 10,737,445 B1   8/2020   Kayhart et al.

FOREIGN PATENT DOCUMENTS

| DE | 33 45 011 | 6/1985 |
|---|---|---|
| DE | 10 2010 053 636 | 6/2012 |

(Continued)

OTHER PUBLICATIONS

Search Report dated Sep. 28, 2021 in German Patent Application Serial No. 102021200772.4.

*Primary Examiner* — Jeffry H Aftergut
(74) *Attorney, Agent, or Firm* — COZEN O'CONNOR

(57) ABSTRACT

A method for producing a structural component part (1) from a fiber-reinforced plastic according to a three-dimensional winding process. Threadlike or strand-shaped fiber material (12) supplied on at least one bobbin (18) is wound around at least one filament carrier (11) in at least one winding pattern by at least one computer-controlled winding device (10). The fiber material (12) is laid down on the filament carrier (11) with a filament tensile force ($F_{ZN}$) that is preadjusted by a control device (14). The filament tensile force ($F_{Zist}$) is controlled depending on location and/or depending on path in order to take into account specific lay-down locations (29) on the filament carrier (11) in which a lay-down path (28) predefined by the winding pattern is departed from owing to the local geometry at preadjusted filament tensile force ($F_{ZN}$).

17 Claims, 6 Drawing Sheets

(51) Int. Cl.
  *B29C 53/80* (2006.01)
  *B29K 21/00* (2006.01)
  *B29K 105/10* (2006.01)

(52) U.S. Cl.
  CPC .... *B29C 70/382* (2013.01); *B29C 2053/8025* (2013.01); *B29K 2021/006* (2013.01); *B29K 2105/10* (2013.01)

(56) References Cited

FOREIGN PATENT DOCUMENTS

| | | |
|---|---|---|
| DE | 10 2013 014 032 | 12/2014 |
| DE | 10 2016 001 056 | 7/2016 |
| DE | 10 2016 012 594 | 6/2017 |
| DE | 10 2017 011 461 | 6/2018 |
| JP | 2969141 B2 * | 8/1999 |
| JP | 2019-72895 A * | 5/2019 |
| JP | 2019-107772 A * | 7/2019 |
| JP | 6969343 B2 * | 11/2021 |
| WO | WO 2001/64570 | 9/2001 |
| WO | WO 2016/011252 | 1/2016 |
| WO | WO 2019/025165 | 2/2019 |
| WO | WO-2021/151589 A1 * | 8/2021 |

* cited by examiner

METHOD FOR PRODUCING A COMPONENT MADE OF A FIBER-REINFORCED PLASTIC

PRIORITY CLAIM

This is a U.S. national stage of application No. PCT/EP2021/085001, filed on Dec. 9, 2021. Priority is claimed on Germany Application No. 10 2021 200 772.4, filed Jan. 28, 2023, the content of which is incorporated herein by reference.

BACKGROUND OF THE INVENTION

The invention is directed to a method for producing a structural component part from a fiber reinforced plastic [according to the preamble of claim 1]. The invention is further directed to a computer-aided winding device [according to the preamble of claim 10].

A method and a winding device of the kind mentioned above are known from DE 10 2015 012 594 A1. To produce a structural component part from a fiber-reinforced plastic according to a three-dimensional winding process, threadlike or strand-shaped fiber material which is supplied on at least one bobbin is wound around at least one filament carrier in at least one winding pattern by means of a computer-aided winding device. The fiber material is laid down on the filament carrier with a filament tensile force which is preadjusted by a control device and maintained constant. The fiber material is laid down along geodesic lines as laydown paths, by which is meant the shortest line between two points on a curved surface. Laying down the fiber material along geodesic lines as laydown paths makes it possible to lay down the fiber material without the aid of adhesive effects and without slippage of the fiber material laid down along the geodesic line.

It may be advantageous for certain areas of the structural component part to lay down the fiber material so as to deviate from the geodesic line in order to form load paths which are curved owing to the geometric/structural characteristics of the structural component part, to assist in load transfer of locally multiaxial stress states, to achieve certain transition points in the course of laying down the fiber material, or to prevent particular material accumulation points in the laminate which is built up by laying down the fiber material.

Proceeding from the prior art described above, it is the object of the present invention to lay down the fiber material so as to deviate from geodesic lines in complex geometric areas of the structural component part without the fiber material slipping back onto the geodesic line from a laydown path in these areas.

SUMMARY OF THE INVENTION

According to a disclosed embodiment, a method is suggested for producing a structural component part from a fiber-reinforced plastic according to a three-dimensional winding process in which threadlike or strand-shaped fiber material which is supplied on at least one bobbin is wound around at least one filament carrier in at least one winding pattern by means of at least one computer-controlled winding device. The fiber material is laid down on the filament carrier with a filament tensile force that is preadjusted by a control device. In order to prevent the fiber material which is laid down on a predetermined lay-down path deviating from a geodesic line from slipping off, it is provided according to the invention that the filament tensile force is controlled depending on location and/or depending on path to take into account specific lay-down locations on the filament carrier in which a lay-down path predefined by the winding pattern is departed from owing to the local geometry at preadjusted filament tensile force. The filament tensile force is adapted depending on location and/or depending on path in order to maintain the predefined lay-down path of the fiber material deviating from the geodesic line at specific lay-down locations on the filament carrier. The method makes it possible to lay down the fiber material at specific lay-down locations on the filament carrier in deviation from the geodesic line in order to form load paths of the structural component part to be produced which are curved because of geometric and/or structural characteristics. Further, load transfer of locally multiaxial stress states in the finished structural component part can be assisted. Also, determined material accumulation points in the laminate can be prevented. In particular, high preadjusted filament tensile forces can be realized in order to achieve a sufficient compaction of the laminate, i.e., of the winding layers of fiber material formed on the filament carrier. For this purpose, the preadjusted filament tensile force is only adapted in the region of the specific lay-down locations.

To this end, the preadjusted filament tensile force can be increased to a predefinable maximum tensile force before such a specific lay-down location is reached and can be decreased to a predefinable minimum tensile force immediately after passing the specific lay-down location for covering a lay-down distance, after which the filament tensile force is increased again to the preadjusted filament tensile force. The preadjusted filament tensile force is preferably between 30 N and 120 N. The predefinable maximum tensile force or minimum tensile force deviating from these values can exceed or fall below the value of the preadjusted filament tensile force by a value ranging between 10 N and 30 N.

In particular, the covered lay-down distance over which the fiber material is laid down with minimum tensile force can be determined depending on the adhesive properties of the fiber material. In this way, it can be ensured that the adhesive force of the fiber material at the surface of the filament carrier or layers of fiber material already located below the latter is sufficient to increase the filament tensile force to the preadjusted filament tensile force without slipping off onto the geodesic line.

The length of the lay-down distance is selected in such a way that the fiber material is prevented from aligning with the geodesic line in the region of the specific lay-down location.

The respective change in the filament tensile force can preferably follow a ramp-shaped course. This has the advantage that the change in the preadjusted filament tensile force to a predefinable maximum tensile force follows a positive ramp such as a startup ramp. In a corresponding manner, the predefinable maximum tensile force is decreased to the predefinable minimum tensile force with a negative ramp such as a braking ramp or is increased to the preadjusted filament tensile force likewise following a startup ramp proceeding from the predefinable minimum tensile force. The positive or negative ramp-shaped course of the changes in the filament tensile force prevents an overload causing damage to the fiber material to be laid down or the unwanted detachment of fiber material which has already been laid down.

According to a further aspect, the preadjusted filament tensile force can be varied depending on different winding patterns formed during the winding process. Depending on the latter, the predefinable maximum tensile force can be varied to the predefinable minimum tensile force.

In particular, geometric qualities of the filament carrier and/or geometric features formed on the filament carrier during the winding process which are brought about or originate through change of direction within the winding pattern and/or through deflections due to the geometry of the filament carrier and/or through overlapping areas of a plurality of directions of windings as the fiber material is laid down can be accounted for as specific lay-down locations.

Further, the preadjusted filament tensile force can be controlled depending on a local lay-down angle and/or on a laminate thickness achieved during the winding process. Accordingly, for example, the fact that the preadjusted filament tensile force must be decreased as the laminate thickness increases in order to prevent necked-in portions can be taken into account.

Towpreg, i.e., a preimpregnated threadlike or strand-shaped semifinished product comprising a fiber-reinforced thermoset plastic, can preferably be used as fiber material. Since the thermoset plastic is in a gel-like state at least when the towpreg is only in a partially cured state, the fiber material has a highly adhesive characteristic.

A computer-controlled winding device is also disclosed for producing a structural component part from a fiber-reinforced plastic according to a three-dimensional winding process. The computer-controlled winding device is adapted to wind a threadlike or strand-shaped fiber material supplied on at least one bobbin around a filament carrier according to at least one predefinable winding pattern with a filament tensile force. The winding device is adapted to lay down the fiber material on the filament carrier with a filament tensile force preadjusted by a control device. The winding device is adapted to control the filament tensile force depending on location and/or depending on path to take into account specific lay-down locations on the filament carrier in which a lay-down path predefined by the winding pattern is departed from because of the local geometry at preadjusted filament tensile force. As regards advantages, reference is made to the advantages of the method according to the invention.

The control device can have a storage unit in which winding patterns are storable and a computing unit for controlling the winding device. This makes it possible to present one or more winding patterns for producing the structural component part.

In particular, in order to adapt the filament tensile force in a location-dependent pattern, the control device can be configured to determine the specific lay-down locations depending on the geometry of the filament carrier to be wrapped and depending on the at least one winding pattern to be used.

The control device can preferably be adapted to increase the preadjusted filament tensile force to a predefinable maximum tensile force before such a specific lay-down location is reached and to decrease the preadjusted filament tensile force to a predefinable minimum tensile force immediately after passing the specific lay-down location for covering a lay-down distance, after which the filament tensile force is increased again to the preadjusted filament tensile force.

In order to control the filament tensile force, at least one apparatus can be provided for adjusting and maintaining the respective filament tensile force. The apparatus can be controlled by the control device. The control device can have an input/output unit which enables presetting of the filament tensile force to be preadjusted. Further, winding patterns can be selected and the minimum tensile force and maximum tensile force can be predefined by means of the input/output unit.

To this end, the at least one apparatus can comprise at least one electronically controlled drive motor which drives the bobbin. The drive motor can preferably be constructed as a synchronous motor. Synchronous motors are advantageously suited to applications in which a load-independent stable rate of rotation is required, as is the case for maintaining the filament tensile force. Further, a synchronous motor allows a compact and efficient design of the apparatus for maintaining the filament tensile force, which is reflected in the total weight of the at least one apparatus. Every bobbin can be individually driven by an electronically controlled synchronous motor.

Further, the at least one apparatus can have at least one sensor unit for continuous detection of the filament tensile force. The at least one sensor unit preferably operates in a non-contacting manner in order to minimize the influence on the filament tensile force to be detected.

The structural component part can be constructed particularly as a multipoint link for a chassis of a motor vehicle or utility vehicle.

The invention is not limited to the indicated combination of features of the independent claims or the claims depending on the latter. Further, it is also possible to combine individual features as far as they arise from the claims, the following description of preferred embodiment forms of the invention or directly from the drawings. When the claims refer to the drawings through the use of reference numerals, this is not intended to limit the protective scope of the claims.

BRIEF DESCRIPTION OF THE DRAWINGS

Advantageous embodiments of the invention which are described in the following are shown in the drawings. The drawings show.

DETAILED DESCRIPTION OF THE PRESENTLY PREFERRED EMBODIMENTS

Figures 1A, 1B, 1C, 1D, 1E:
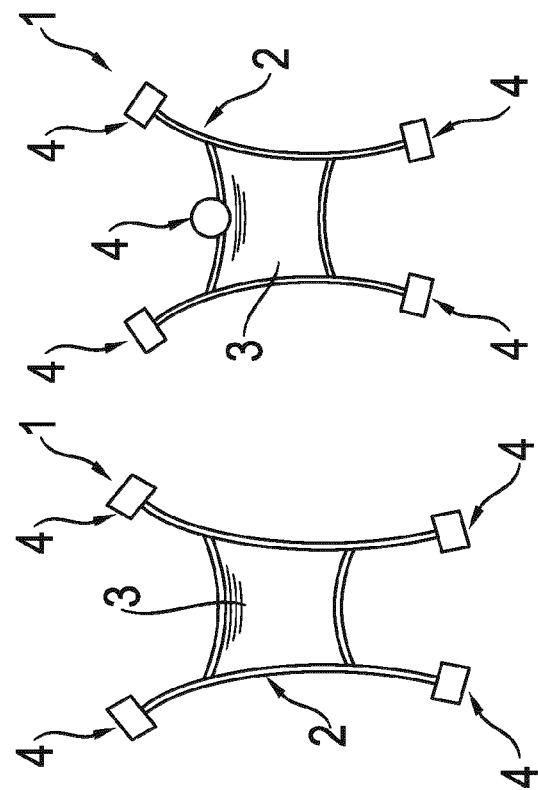
FIGS. 1a-1e schematic views of fiber-reinforced structural component parts constructed as multipoint links.

FIGS. 1a to 1e show schematic views of fiber-reinforced structural component parts 1 formed as multipoint links. FIG. 1a shows a structural component part 1 of a chassis of a passenger vehicle or utility vehicle which is constructed as a two-point link. The structural component part 1 comprises a body 2 having at least two load introduction regions 4 which are connected to one another by a connection structure 3. In particular, the connection structure 3 of the body 2 can be constructed as a hollow profile. The body 2 substantially determines the basic shape of the structural component part 1. FIGS. 1b and 1c show two exemplary variants of a structural component part 1 formed as a three-point link. FIGS. 1d and 1e show an exemplary structural component part 1 formed as a four-point link and five-point link, respectively. Structural component parts 1 constructed as multipoint links can connect kinematic points in a chassis and/or in a wheel suspension and transmit motion and/or forces. The connection of the multipoint link to further component parts of the chassis can be realized by means of joints which are arranged in the load introduction regions 4. Owing to the symmetry of their shape and the arrangement of the load introduction regions 4, these structural component parts 1 have a definite, substantially constant load flow which is limited to a few dominant load directions. The fabrication of such structural component parts 1 as fiber-reinforced structural component parts by means of a three-dimensional winding process makes it possible to produce functional structural component parts which have a very small mass and, at the same time, high strength values and stiffness values.

Figure 2:
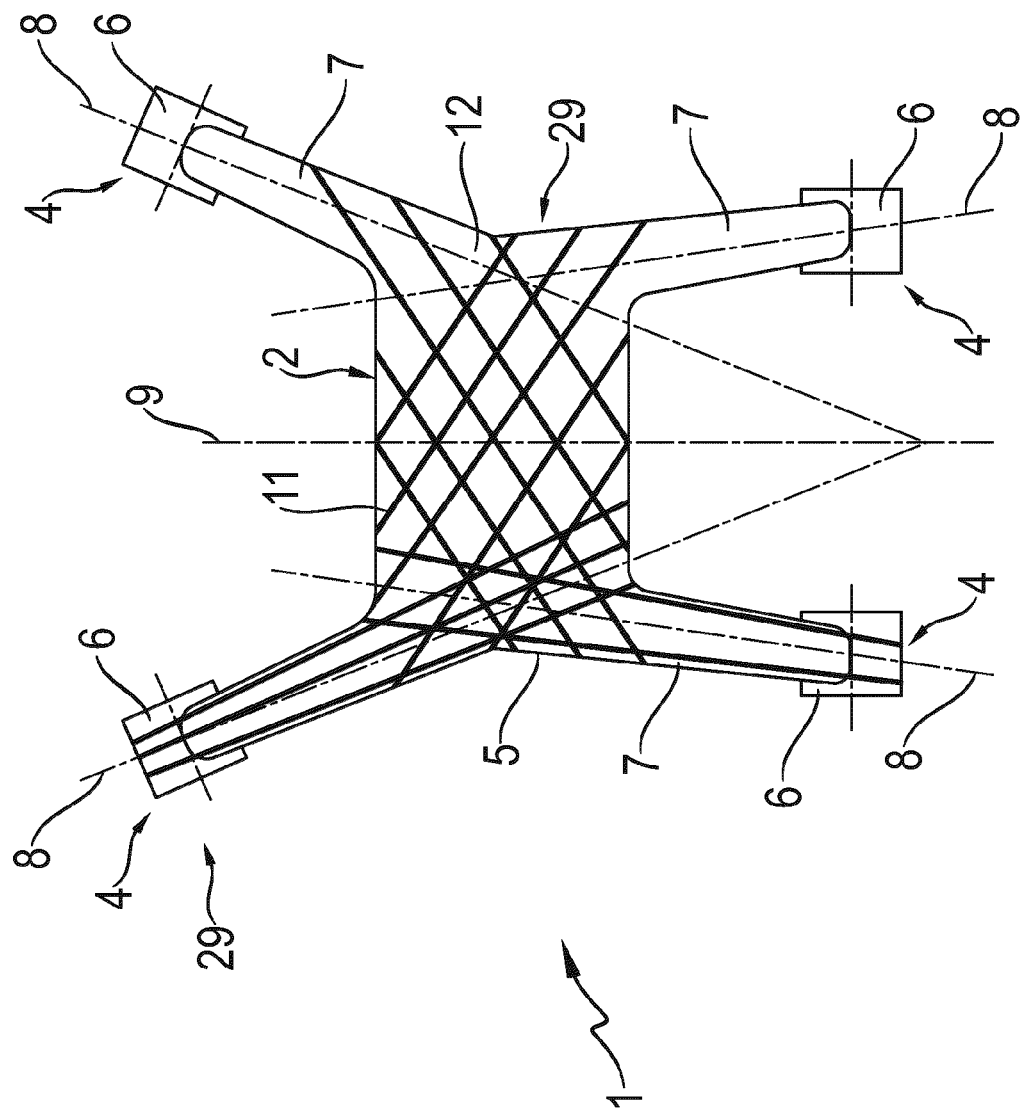
FIG. 2 a schematic top view of a structural component part constructed as four-point link.

According to FIG. 2, a structural component part 1 for a wheel suspension of a vehicle is constructed as a four-point link and comprises a body 2, the basic shape of this body 2 being predefined by a core element or filament carrier 12, respectively. The structural component part 1 further comprises at least one threadlike fiber material 12 and four bushings 6 arranged in the respective load introduction regions 4 to be formed. The threadlike fiber material 12 laid down on the filament carrier 11 is shown by way of example and in a highly simplified manner. In particular, the threadlike fiber material 12 substantially forms the entire surface of the structural component part 1 constructed as four-point link. The body 2 comprises a torsional element 5 and four carrier arms 7 integrally connect to the torsional element 5. The respective bushing 6 for receiving a respective bearing element, particularly a molecular joint, not shown, is arranged at a respective distal end of the respective carrier arm 7. The four-point link 1 is used, for example, in a tractor as a chassis link and takes on the tasks of an A-arm or triangle link and stabilizer. Consequently, the four-point link 1 is responsible for the transverse guidance and, crucially, for the longitudinal guidance of the axle. Further, the four-point link 1 is also responsible for roll stabilization.

The respective bushing 6 and the threadlike fiber material 12 are connected to one another at least by frictional engagement in that the threadlike fiber material 12 is at least partially wound around the filament carrier 11 and the respective bushing 6.

The filament carrier 11 is non-load carrying and only serves to give shape to the threadlike or strand-shaped fiber material 12. The fiber material 12 comprises a plurality of continuous fibers and is preimpregnated with a resin. In contrast, the filament carrier 11 is formed from a foam material. Further, the respective bushing 6 is formed from a metallic material. The filament carrier 11, the fiber material 12 and the bushings 6 are formed quasi-integral and intrinsically joined.

In particular, exactly one fiber material 12 can be wound multiple times around the filament carrier 11 and the respective bushing 6. The fiber material 12 is guided at the respective carrier arm 7 substantially parallel to a respective longitudinal axis 8 of the respective carrier arm 7 in order to absorb bending stresses. Further, the fiber material 12 is guided at the torsional element 5 at an angle of approximately 40° to approximately 60°, preferably 45°, relative to a longitudinal axis 9 of the four-point link 1 in order to absorb shear stresses resulting from torsion.

An embodiment form of a computer control winding device 10 for fabricating such fiber-reinforced structural component parts 1 according to a three-dimensional winding process and a method for producing a structural component part 1 from a fiber reinforced plastic according to a three-dimensional winding process are described in the following. By means of the at least one computer-controlled winding device 10, threadlike or strand-shaped fiber material 12 which is supplied on at least one bobbin 18 and which is formed as towpreg semifinished product is wound around at least one filament carrier 11 in at least one winding pattern. Depending on the construction of the structural component part 1 to be produced, a plurality of winding patterns can be utilized in winding around the filament carrier 11. Every winding pattern influences at least one mechanical characteristic of the component 1. The mechanical characteristics of the component 1 can be selectively, i.e., precisely, adjusted by means of the sequence, the repetition, the mixture, and/or the choice of material of the individual winding patterns.

Figure 3:
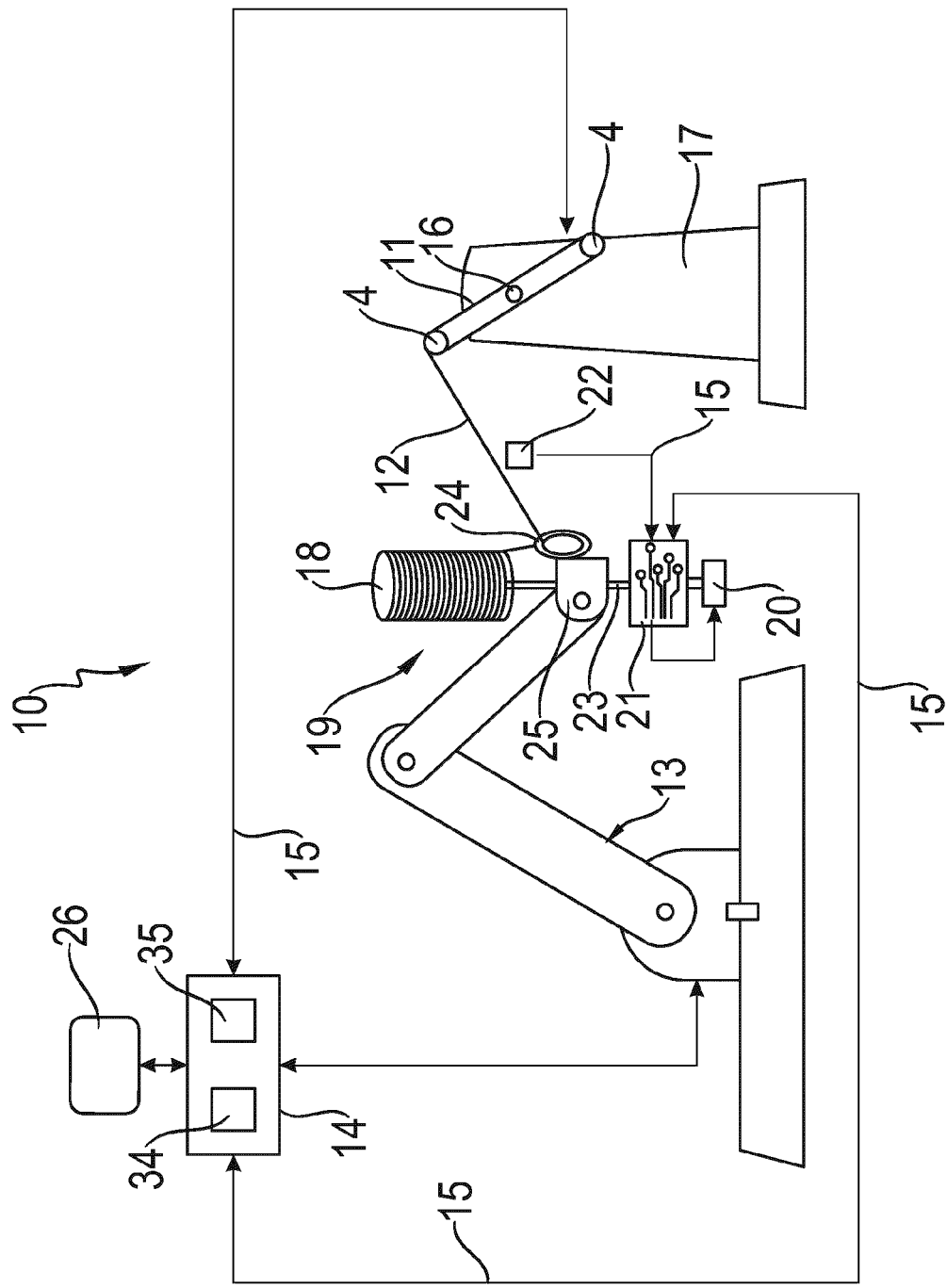
FIG. 3 a schematic diagram of a device for fabricating fiber-reinforced structural component parts according to a three-dimensional winding process.

FIG. 3 schematically shows the winding device 10 for producing a fiber-reinforced structural component part 1 from a fiber-reinforced plastic according to a three-dimensional winding process. The computer-aided winding device 10 is configured to wind a threadlike fiber material 12 supplied on at least one bobbin 18 around at least one filament carrier 11. The filament carrier 11 forms a core element of the structural component part 1 which substantially predetermines the principal contour of the structural component part 1 to be produced in the three-dimensional winding process but without exercising a load-carrying function. The schematic view in FIG. 3 shows the filament carrier 11 with joint elements already arranged thereon in the load introduction regions 4. The fiber material 12 is laid down in the form of a winding pattern or a plurality of different winding patterns, each winding pattern being assigned a determined task for influencing one or more mechanical properties of the structural component part 1.

The winding device 10 is constructed in this instance and in a preferred manner as at least one robot arm 13 having six axes of rotation. A control device 14 which communicates wirelessly or hardwiredly with the robot arm 13 through a signal line or a bus system 15 is provided for controlling the at least one robot arm 13. The filament carrier 11 on which the at least one fiber strand 12 is wound with at least one winding pattern which can be preset by the control device 14 is arranged on a driven pivot shaft 16 of a pivot mounting 17. The driving of the pivot shaft 16 can likewise be controlled by the control device 14 via the bus system 15. The pivot shaft 16 of the pivot mounting 17 forms a seventh axis of rotation of the device 10. The substantially threadlike fiber material 12 is provided on the at least one bobbin 18. The bobbin 18 is arranged on the head of the robot arm 13 which forms a fiber guide device 25 and is guided along by this fiber guide device 25. The bobbin 18 can also be arranged spatially distant from the robot arm 13.

The device 10 further comprises at least one apparatus 19 for maintaining a preadjusted filament tensile force $F_{ZN}$. An input/output unit 26 which communicates with the control device 14 is provided for inputting or selecting the preadjusted filament tensile force $F_{ZN}$. Further, different winding patterns can be selected and/or adjusted and a minimum tensile force $F_{Zmin}$ and a maximum tensile force $F_{Zmax}$ can be predefined by means of the input/output unit.

The respective apparatus 19 comprises a drive motor 20 constructed in particular as an electronically controlled synchronous motor, a computing unit 21 and at least one sensor unit 22 for detecting an actual filament tensile force $F_{Zist}$. The bobbin 18 is arranged on a spindle 23 so as to be fixed with respect to rotation relative to it, this spindle 23 being driven by the drive motor 20. The threadlike or strand-shaped fiber material 12 taken off from the bobbin 18 is guided through a guide element 24 which is arranged at the fiber guide device 25 and which has a substantially circular outlet cross section, and the fiber material 12 is laid down on and wound around the filament carrier 11.

In order to monitor the filament tensile force $F_{Zist}$, at least one sensor unit 22 can be arranged along the free path of the at least one fiber material 12 between the takeoff point on the bobbin 18 and the laydown point on the filament carrier 11.

The computing unit 21 is adapted to evaluate the signals of the at least one sensor unit 22 and to control the at least one drive motor 20 depending on the detected filament tensile force $F_{Zist}$. The control of the at least one synchronous motor 20 by means of the computing unit 21 makes it possible to maintain the preadjusted filament tensile force $F_{ZN}$. This is necessary on the one hand in order to prevent lengthening or shortening of the fiber material 12 to be laid down on the filament carrier 11 brought about by the movement of the robot arm 13. For this purpose, the control device 14 of the robot arm 13 can be connected to the computing unit 21 through the bus system 15 in order to transmit the movement profile of the robot arm 13 having six axes of rotation to the computing unit 21 to prepare the adjusted winding profile. The precision with which the preadjusted filament tensile force $F_{ZN}$ is maintained through the control of the synchronous motor 20 can be increased in this way. The bobbin 18 driven by the synchronous motor 20 can be operated in such a way that it is possible to alternately unspool and re-spool the fiber material 12 by changing the direction of rotation. The control device 14 can also be adapted to additionally assume the task of the computing unit 21 which could then be dispensed with.

Figure 4:
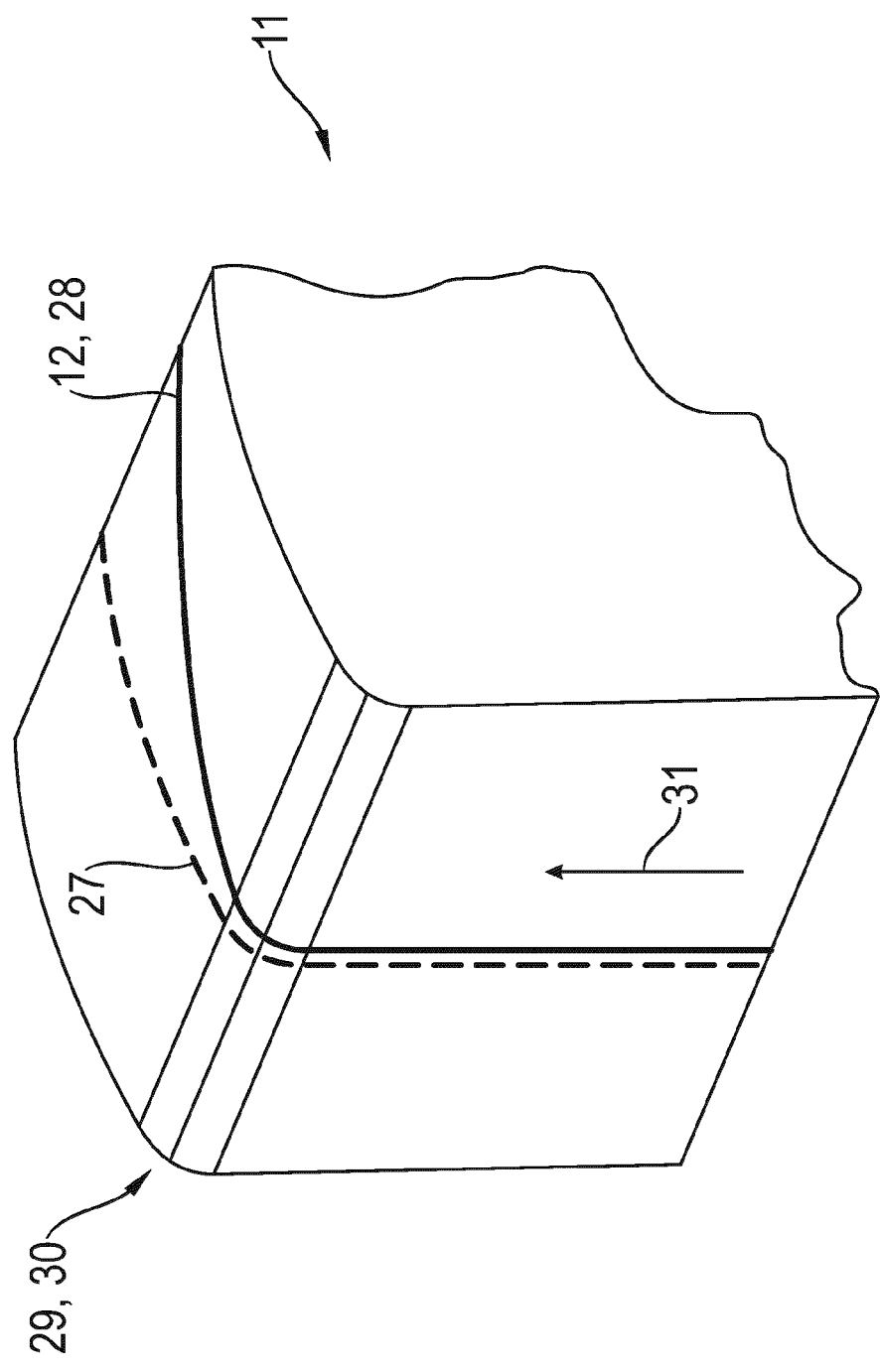
FIG. 4 a schematic partial view of an edge of a filament carrier which forms a specific lay-down location.

In a schematic partial view, FIG. 4 shows an edge 30 of the filament carrier 11 which forms a specific lay-down location 29. It may be advantageous for particular areas of the structural component part 1 to lay down the fiber material 12 on a lay-down path 28 deviating from a geodesic line 27 in order to form load paths which are curved owing to the geometric/structural characteristics of a respective specific lay-down location 29 of the structural component part, to assist in load transfer of locally multiaxial stress states, to achieve certain transition points in the course of laying down the fiber material 12, or to prevent particular material accumulation points in the laminate which is built up layer by layer by laying down the strand-like or thread-like fiber material 12. In the present depicted case, the curved edge 30 at the outer contour of the filament carrier 11 forms a specific lay-down location 29 on the filament carrier 11. A further specific lay-down location 29 can be the bushing 6 to be wrapped in the load introduction region 4 of the structural component part 1. Lateral necked-down portions at the torsional element 5 as shown in FIG. 2 form further specific lay-down locations 29.

A deflection of the fiber material 12, for example, by 90°, can come about at the edge 30. Because of the local geometry of the edge 30 causing the deflection, the lay-down path 28 predetermined by the winding pattern can be departed from at such a specific lay-down location 29 on the filament carrier 12 at the preadjusted filament tensile force $F_{ZN}$, and the fiber material 12 can slip back on and off the geodesic path 27. The filament lay-down path, i.e., the path length along the lay-down path 28, is designated by reference character S. The filament lay-down path S also shows the winding direction or lay-down direction of the fiber material 12.

Geometric qualities of the filament carrier 11 and/or geometric features formed on the filament carrier 11 during the winding process which are brought about or originate through change of direction within the winding pattern and/or through deflections due to the geometry of the filament carrier 11 and/or through overlapping areas of a plurality of directions of windings as the fiber material 12 is laid down are accounted as specific lay-down locations.

In order to prevent the fiber material 12 which is laid down on the predetermined lay-down path 28 deviating from a geodesic line 27 from slipping off, it is provided according to the invention that the filament tensile force $F_{Zist}$ is controlled depending on location and/or depending on path to take into account specific lay-down locations 29 on the filament carrier 12 in which a lay-down path 28 predefined by the winding pattern is departed from owing to the local geometry at preadjusted filament tensile force $F_{ZN}$. The filament tensile force $F_{Zist}$ is adapted depending on location and/or depending on path in order to maintain the predefined lay-down path 28 of the fiber material 12 deviating from the geodesic line 27 at specific lay-down locations 29 on the filament carrier 12, i.e., to prevent slipping off on the geodesic line 27.

Figure 5:
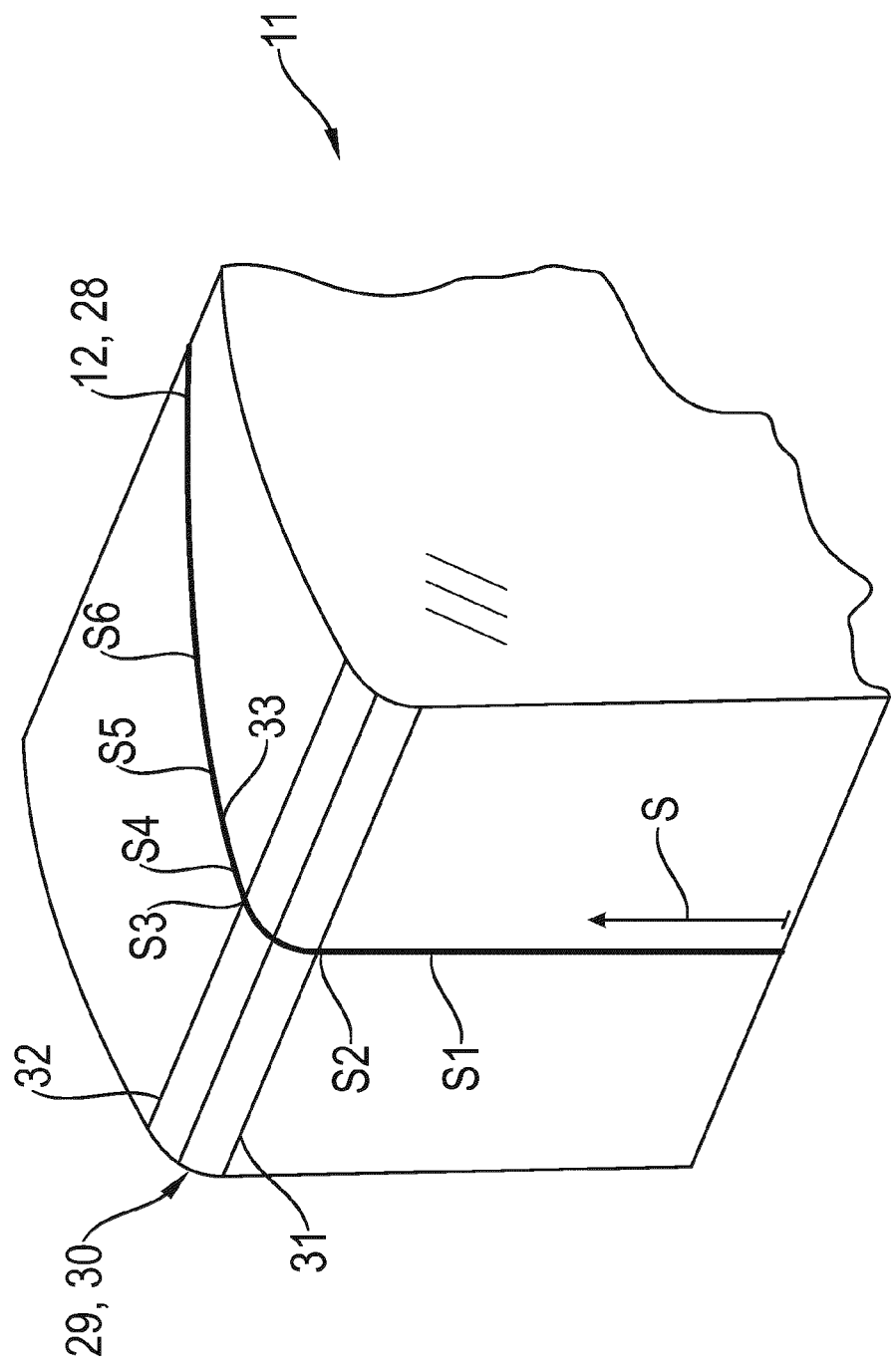
FIG. 5 a schematic diagram of the filament carrier according to FIG. 4 with fiber material laid down thereon along a filament lay-down path.
Figure 6:
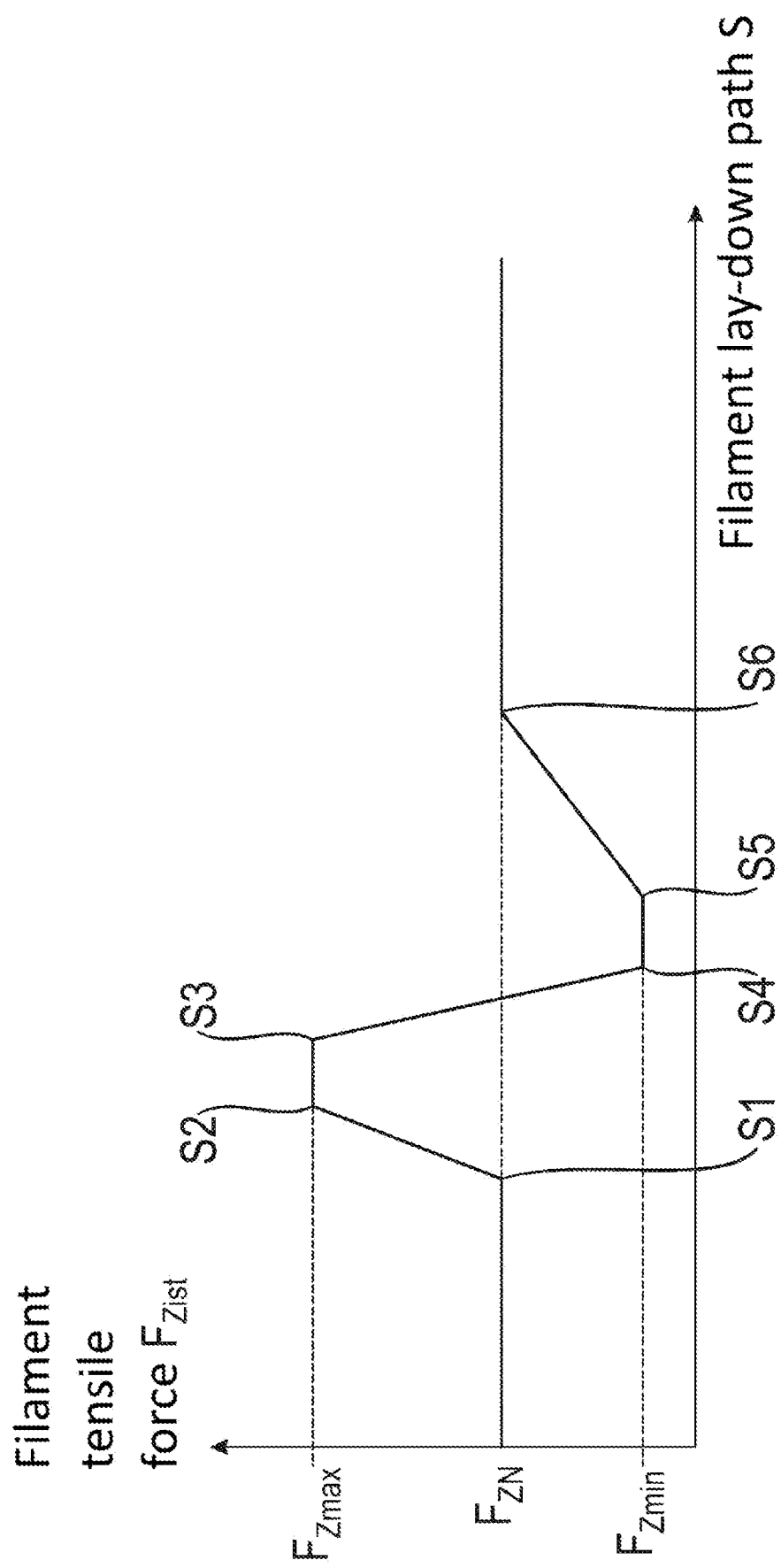
FIG. 6 a diagram showing the exemplary curve of the filament tensile force over the filament lay-down path according to FIG. 5.

The filament carrier 11 according to FIG. 4 with fiber material 12 laid down thereon along a filament lay-down path S is shown schematically in FIG. 5. FIG. 6 shows an exemplary diagram of the curve of the filament tensile force $F_{Zist}$ along the filament lay-down path S according to FIG. 5. The location-dependent and/or path-dependent control of the filament tensile force $F_{Zist}$ is explained by way of example for the deflection around the edge 30 as a specific lay-down location 29 with reference to the diagrams in FIGS. 5 and 6.

The fiber material 12 is initially laid down with the preadjusted filament tensile force $F_{ZN}$ which is maintained by the cooperation of the control device 14 and computing unit 21. The filament tensile force is increased from the preadjusted filament tensile force $F_{ZN}$ to value $F_{Zmax}$ when a point S1 before edge 30 is reached. The increase in the filament tensile force $F_{Zist}$ follows a substantially ramp-shaped curve. The position in front of the specific lay-down location 29 or the distance of point S1 from the specific lay-down location 29, respectively, depends on the control speed of the control device 14 at which the filament tensile force $F_{Zist}$ can be increased from $F_{ZN}$ to $F_{Zmax}$ by the apparatus 19 without overloading the fiber material 12. At point S2, the filament tensile force $F_{Zist}$ reaches the value of the predefined maximum filament tensile force $F_{Zmax}$. Considered in lay-down direction of the fiber material 12, point S2 represents the actual start 31 of the specific lay-down location 29, in this instance, the edge 30. The maximum filament tensile force $F_{Zmax}$ is maintained for the filament lay-down path S between point S2 and a subsequent point S3. Viewed in lay-down direction of the fiber material 12, point S3 marks the end 32 of the specific lay-down location 29, in this instance, the edge 30.

The filament tensile force $F_{Zist}$ is decreased to the minimum filament tensile force $F_{Zmin}$ between point S3 and point S4. The decrease in the filament tensile force $F_{Zist}$ also follows a substantially ramp-shaped curve. The ramp-shaped curve during the decrease in filament tensile force $F_{Zist}$ has a greater slope compared with the preceding increase in the filament tensile force $F_{Zist}$.

Between point S4 and a point S5, the fiber material 12 is laid down along a predefinable lay-down distance 33 with only minimal filament tensile force $F_{Zmin}$. In particular, the covered lay-down length over which the fiber material 12 is laid down with minimum tensile force $F_{Zmin}$ can be determined depending on the adhesive properties of the fiber material 12. In this way, it can be ensured that the adhesive force of the fiber material 12 at the surface of the filament carrier 11 or layers of fiber material 12—the laminate—already located below the latter, respectively, is sufficient to subsequently increase the filament tensile force $F_{Zist}$ to the preadjusted filament tensile force $F_{ZN}$ without the fiber material 12 slipping off onto the geodesic line 27. The length of the lay-down distance 33 is selected in such a way that the fiber material 12 is prevented from aligning with the geodesic line 27 in the region of the specific lay-down location 29.

At the end of the lay-down distance 33 which is determined by point S5, the filament tensile force $F_{Zist}$ is increased to the preadjusted filament tensile force $F_{ZN}$. In this case again, the increase in the filament tensile force $F_{Zist}$ follows a ramp-shaped curve until the preadjusted filament tensile force $F_{ZN}$ is reached at point S6.

The control device 14 has a storage unit 34 in which winding patterns can be stored and a computing unit 35 for controlling the winding device 10. The control device 14 can be configured to determine the specific lay-down locations 29 depending on the geometry of the filament carrier 11 to be wrapped and depending on the at least one winding pattern to be used so as to adjust the filament tensile force $F_{Zist}$ depending on location and/or path.

A plurality of ramp-shaped curves can be stored, particularly so as to be editable, in the storage unit 34. This makes it possible to adapt to different utilized fiber materials 12 and/or preadjusted filament tensile forces $F_{ZN}$.

The control device 14 can be configured in such a way that the filament tensile force $F_{Zist}$ is controlled depending on a local lay-down angle and/or a laminate thickness, i.e., layer thickness of fiber material 12 that has already been laid down, reached during the winding process. Further, the preadjusted filament tensile force $F_{ZN}$ can be controlled depending on a local lay-down angle and/or a laminate thickness reached during the winding process. Accordingly, for example, the fact that the preadjusted filament tensile force $F_{ZN}$ must be decreased as the laminate thickness increases in order to prevent necked-in portions can be taken into account.

The invention claimed is:

1. A method for producing a structural component part from a fiber-reinforced plastic according to a three-dimensional winding process, wherein threadlike or strand-shaped fiber material which is supplied on at least one bobbin is wound around at least one filament carrier in at least one winding pattern by means of at least one computer-controlled winding device, wherein the fiber material is laid down on the filament carrier with a filament tensile force (FZN) that is preadjusted by a control device, wherein the filament tensile force (FZist) is controlled depending on location and/or depending on path to take into account specific lay-down locations on the filament carrier in which a lay-down path predefined by the winding pattern is departed from owing to the local geometry at preadjusted filament tensile force (FZN).

2. The method according to claim 1, wherein the preadjusted filament tensile force (FZN) is increased to a predefinable maximum tensile force (FZmax) before such a specific lay-down location is reached and is decreased to a predefinable minimum tensile force (FZmin) immediately after passing the specific lay-down location for covering a lay-down distance, after which the filament tensile force (FZist) is increased again to the preadjusted filament tensile force (FZN).

3. The method according to claim 2, wherein the covered lay-down distance over which the fiber material is laid down with minimum tensile force (FZmin) is determined depending on the adhesive properties of the fiber material.

4. The method according to claim 2, wherein the length of the lay-down distance is selected in such a way that the fiber material is prevented from aligning with the geodesic line in the region of the specific lay-down location.

5. The method according to claim 1, wherein the respective change in the filament tensile force (FZist) follows a ramp-shaped course.

6. The method according to claim 1, whthe preadjusted filament tensile force (FZN) is varied depending on different winding patterns formed during the winding process.

7. The method according to claim 1, wherein geometric qualities of the filament carrier and/or geometric features formed on the filament carrier during the winding process which are brought about or originate through change of direction within the winding pattern and/or through deflections due to the geometry of the filament carrier and/or through overlapping areas of a plurality of directions of windings as the fiber material is laid down are accounted for as specific lay-down locations.

8. The method according to claim 1, wherein the filament tensile force (FZist) is controlled depending on a local lay-down angle and/or on a laminate thickness achieved during the winding process.

9. The method according to claim 1, wherein towpreg is used as fiber material.

10. A computer-controlled winding device for producing a structural component part from a fiber-reinforced plastic according to a three-dimensional winding process, wherein the computer-controlled winding device is adapted to wind a threadlike or strand-shaped fiber material supplied on at least one bobbin around a filament carrier according to at least one predefinable winding pattern with a filament tensile force (FZist), wherein the winding device is adapted to lay down the fiber material on the filament carrier with a filament tensile force (FZN) preadjusted by a control device, wherein the winding device is controlled to adjust the filament tensile force (FZist) depending on location and/or depending on path to take into account specific lay-down locations on the filament carrier in which a lay-down path predefined by the winding pattern is departed from because of the local geometry at preadjusted filament tensile force (FZN).

11. The computer-controlled winding device according to claim 10, wherein the control device has a storage unit in which winding patterns are storable and a computing unit for controlling the winding device.

12. The computer-controlled winding device according to claim 10, wherein the control device is configured to determine the specific lay-down locations depending on the geometry of the filament carrier to be wrapped and depending on the at least one winding pattern to be used in order to adapt the filament tensile force (FZN) in a location-dependent pattern.

13. The computer-controlled winding device according to claim 10, wherein the control device is adapted to increase the preadjusted filament tensile force (FZN) to a predefinable maximum tensile force (FZmax) before such a specific lay-down location is reached and to decrease the preadjusted filament tensile force (FZN) to a predefinable minimum tensile force (FZmin) immediately after passing the specific lay-down location for covering a lay-down distance, after which the filament tensile force (FZist) is increased again to the preadjusted filament tensile force (FZN).

14. The computer-controlled winding device according to claim 10, wherein at least one apparatus is provided for adjusting and maintaining the respective adjusted filament tensile force (FZN, FZmax, FZmin).

15. The computer-controlled winding device according to claim 14, wherein the at least one apparatus comprises at least one electronically controlled drive motor which drives the at least one bobbin.

16. The computer-controlled winding device according to claim 14, wherein the at least one apparatus has at least one sensor unit for continuous detection of the filament tensile force (FZist).

17. The computer-controlled winding device according to claim 10, wherein the structural component part is constructed as a multipoint link for a chassis of a motor vehicle or utility vehicle.

\* \* \* \* \*